US012710661B2

(12) United States Patent
Nomura et al.

(10) Patent No.: US 12,710,661 B2
(45) Date of Patent: Aug. 18, 2026

(54) HEAD-MOUNTED DISPLAY AND CONTENT DISPLAY SYSTEM

(71) Applicant: Sony Interactive Entertainment Inc., Tokyo (JP)

(72) Inventors: Masanori Nomura, Tokyo (JP); Yasuo Takahashi, Tokyo (JP); Shoi Yonetomi, Tokyo (JP); Yurika Mulase, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/863,660

(22) PCT Filed: May 22, 2023

(86) PCT No.: PCT/JP2023/018929

§ 371 (c)(1),
(2) Date: Nov. 7, 2024

(87) PCT Pub. No.: WO2023/234097

PCT Pub. Date: Dec. 7, 2023

(65) Prior Publication Data

US 2025/0306384 A1 Oct. 2, 2025

(30) Foreign Application Priority Data

Jun. 3, 2022 (JP) ................................ 2022-090927

(51) Int. Cl.
*G02B 27/01* (2006.01)

(52) U.S. Cl.
CPC ..... *G02B 27/0176* (2013.01); *G02B 27/0172* (2013.01); *G02B 2027/014* (2013.01); *G02B 2027/0141* (2013.01)

(58) Field of Classification Search
CPC ........... G02B 27/0172; G02B 27/0176; G02B 2027/014; G02B 2027/0141
See application file for complete search history.

(56) References Cited

U.S. PATENT DOCUMENTS 9,870,716 B1 * 1/2018 Rao .................... H04N 21/2353
11,740,742 B2 * 8/2023 Wang ..................... G06F 3/044
345/174

(Continued)

FOREIGN PATENT DOCUMENTS

CN 109074167 A 12/2018
JP 2008-070817 A 3/2008

(Continued)

OTHER PUBLICATIONS

International Search Report and Written Opinion mailed on Aug. 1, 2023, received for PCT Application PCT/JP2023/018929, filed on May 22, 2023, 11 pages including English Translation.

(Continued)

*Primary Examiner* — Ryan A Lubit
(74) *Attorney, Agent, or Firm* — Kilpatrick Townsend & Stockton LLP

(57) ABSTRACT

A lower outer surface of a housing of an HMD is furnished with a power button and a function button. The power button is a button to turn on and off the supply of power from a predetermined power source to the components of the HMD. The function button is a button that can selectively be assigned one of a plurality of functions regarding the operation of the HMD.

12 Claims, 9 Drawing Sheets

(56) References Cited

U.S. PATENT DOCUMENTS

| | | | | |
|---|---|---|---|---|
| 2011/0080351 | A1* | 4/2011 | Wikkerink | G06F 3/04847 715/764 |
| 2016/0188154 | A1* | 6/2016 | Dong | G06F 3/0487 345/158 |
| 2018/0356636 | A1* | 12/2018 | Kimura | G02B 27/017 |
| 2019/0197737 | A1* | 6/2019 | Kim-Whitty | G06T 7/40 |
| 2020/0322518 | A1* | 10/2020 | Nagata | H04N 23/50 |
| 2021/0157167 | A1* | 5/2021 | Lim | G02B 27/0176 |
| 2021/0382305 | A1* | 12/2021 | Chang | G06F 3/011 |
| 2023/0194899 | A1* | 6/2023 | Su | G02C 5/14 351/111 |
| 2023/0328168 | A1* | 10/2023 | Huang | G06F 3/016 |

FOREIGN PATENT DOCUMENTS

| | | | |
|---|---|---|---|
| JP | 2008085854 | A | * 10/2008 |
| JP | 2011-164955 | A | 8/2011 |
| JP | 2013-200325 | A | 10/2013 |
| JP | 2019-535156 | A | 12/2019 |
| JP | 2020-154155 | A | 9/2020 |
| JP | 2020-173719 | A | 10/2020 |

OTHER PUBLICATIONS

JP2022-090927, “Office Action,” Jan. 6, 2026, 8 pages.

* cited by examiner 2
15
17
AP
10
11
INFORMATION PROCESSING APPARATUS
RECORDING APPARATUS
14
14
16
16
100
1

FIG. 7

START
S20
IS FUNCTION BUTTON PRESSED?
N
Y
S21
IS VIDEO SEE-THROUGH FUNCTION ASSIGNED?
N
Y
S23
IS MUTE FUNCTION ASSIGNED?
N
Y
S25
IS LONG-PRESS OPERATION PERFORMED?
Y
N
S22
SWITCH VIDEO SEE-THROUGH FUNCTION BETWEEN ON AND OFF
S24
SWITCH MIC MUTE FUNCTION BETWEEN ON AND OFF
S26
TRANSITION TO NEXT SCREEN
S27
TRANSITION TO PRECEDING SCREEN
END

HEAD-MOUNTED DISPLAY AND CONTENT DISPLAY SYSTEM

CROSS-REFERENCE TO RELATED APPLICATIONS

This application is a national stage application, pursuant to 35 U.S.C. § 371, of International Patent Application No. PCT/JP2023/018929, filed May 22, 2023, which claims priority to Japanese Patent Application No. 2022-090927, filed Jun. 3, 2022, the entire contents of each are incorporated herein by reference.

TECHNICAL FIELD

The present invention relates to a head-mounted display and a content display system.

BACKGROUND ART

There has been widespread acceptance of image display systems that allow a user wearing a head-mounted display to visually explore a target space from a free viewpoint. For example, there has been known electronic content of which the display target is a virtual three-dimensional space, the content being designed to implement a virtual reality (VR) causing the head-mounted display to display images corresponding to the user's line-of-sight direction (the electronic content may also be referred to as "VR content" hereunder). Use of the head-mounted display can enhance the sense of immersion in imagery and improve the operability of applications such as video games. Also, there have been developed walk-through systems that allow the user wearing the head-mounted display to virtually walk around the space displayed as VR content by physically walking about.

SUMMARY

Technical Problem

The head-mounted display is expected to become more popular than ever from now on. It is therefore desired that the head-mounted display be more user-friendly than before. An object of the present invention is to provide a technology for improving the user-friendliness of the head-mounted display.

Solution to Problem

In order to solve the above problem, according to one embodiment of the present invention, there is provided a head-mounted display including a power button and a function button different from the power button, the function button being able to be selectively assigned one of a plurality of functions regarding an operation of the head-mounted display.

According to another embodiment of the present invention, there is provided a content display system including a head-mounted display and a display control section. The head-mounted display includes a power button and a function button different from the power button, the function button being able to be selectively assigned one of a plurality of functions regarding an operation of the head-mounted display. The plurality of functions include a function of controlling screen transition of content displayed on a display section. In a case where the function of controlling the screen transition of the content is assigned to the function button, an operation of pressing the function button for a relatively short time constitutes an operation of causing a screen of the content to transition in a first direction, and an operation of pressing the function button for a relatively long time constitutes an operation of causing the screen of the content to transition in a second direction opposite to the first direction. In a case where a state of the function button being pressed is continued, the display control section causes the display section to display an image suggesting that the state of the function button being pressed is continued.

It is to be noted that suitable combinations of the above constituent elements and the expressions of the present invention, when converted between a method, a computer program, a recording medium recording the computer program in a readable manner, and a data structure, among others, are also effective as embodiments of the present invention.

BRIEF DESCRIPTION OF DRAWINGS

FIG. 7 is a schematic view depicting an exemplary setting screen for setting a function button.

DESCRIPTION OF EMBODIMENTS

Figure 1:
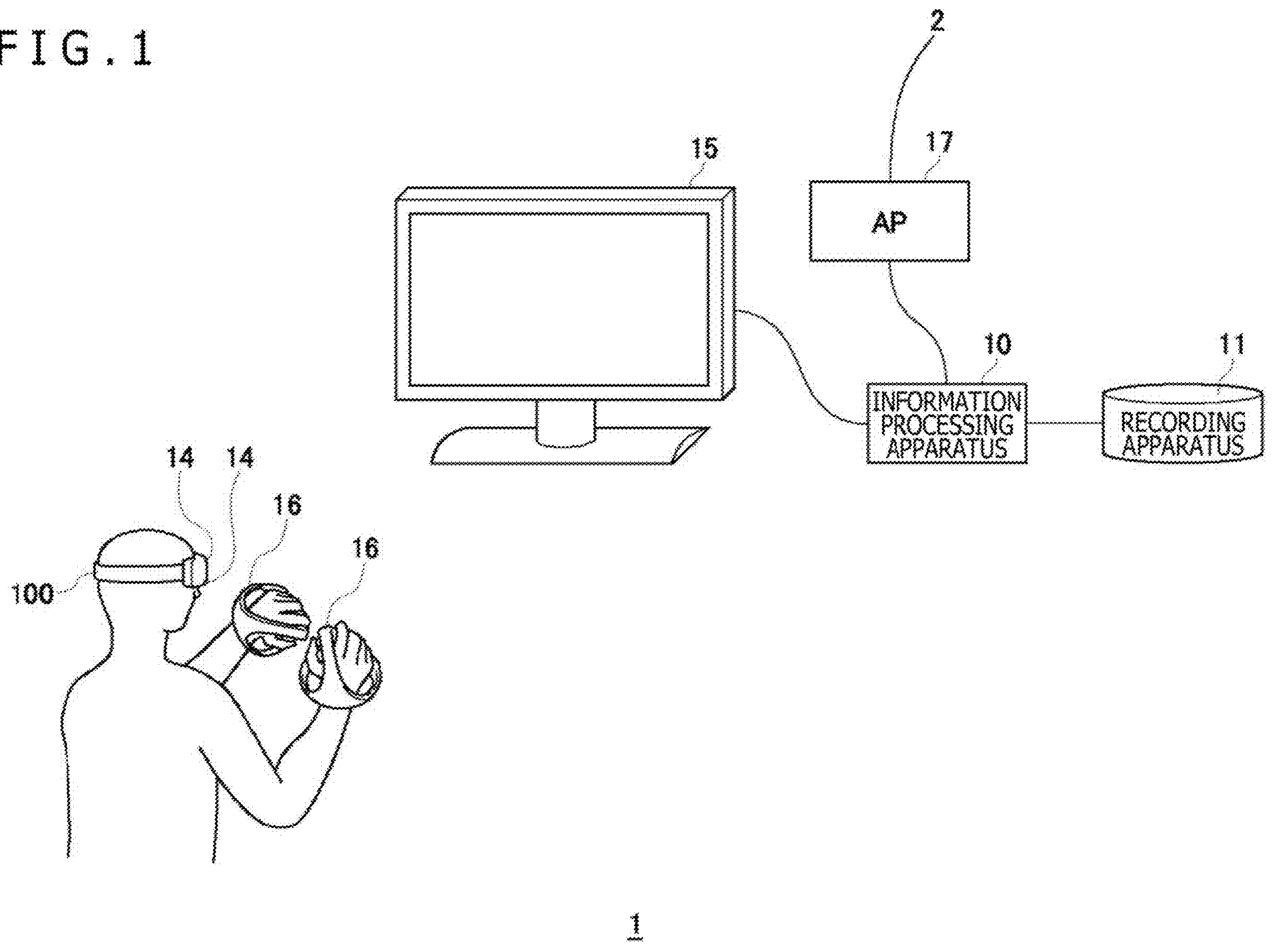
FIG. 1 is a schematic view depicting an exemplary configuration of a content display system in an embodiment.

FIG. 1 depicts an exemplary configuration of a content display system 1 in an embodiment. The content display system 1 is an information processing system that allows an information processing apparatus 10, a recording apparatus 11, a head-mounted display (HMD) 100, an input device 16 held by a user for finger operations, and an output apparatus 15 for image and audio output to operate in coordination with each other. The HMD 100 may also be referred to as a VR headset. The output apparatus 15 may be a television.

The information processing apparatus 10 is connected to an external network 2 such as the Internet via an access point (AP) 17. The information processing apparatus 10 can be connected with other information processing apparatuses or with servers via the network 2. The AP 17 has functions of a wireless access point and a router. The information processing apparatus 10 may be connected with the AP 17 by cable or in accordance with a known wireless communication protocol.

The recording apparatus 11 records system software and applications such as game software. The information processing apparatus 10 may download the game software from a content server to the recording apparatus 11 via the network 2. The information processing apparatus 10 executes applications such as the game software and supplies image and audio data of the applications to the HMD 100. The information processing apparatus 10 and the HMD 100 may be connected with each other by cable or in accordance with a known wireless communication protocol.

The HMD 100 is a display apparatus that displays images on display panels (also referred to as display sections) positioned in front of the user's eyes when worn by the user on the head. The HMD 100 separately displays a left-eye image on a left-eye display panel and a right-eye image on a right-eye display panel. These images make up parallax images seen from right and left viewpoints, constituting a stereoscopic vision. Since the user views the display panels through optical lenses, the information processing apparatus 10 provides the HMD 100 with parallax image data corrected for lens-induced optical distortion.

Although the user wearing the HMD 100 has no need for the output apparatus 15, other users can view images displayed on the output apparatus 15 if the output apparatus 15 is provided. The information processing apparatus 10 may cause the output apparatus 15 to display either the same images as those viewed by the user wearing the HMD 100 or some other images. In a case where the user wearing the HMD and another user play a video game together, for example, the output apparatus 15 may display game images seen from the viewpoint of a character used by the other user. The information processing apparatus 10 may also cause the output apparatus 15 to display a setup screen that supports initial settings of the HMD 100 and the correct way to wear the HMD 100.

The information processing apparatus 10 and the input device 16 may be connected with each other by cable or in accordance with a known wireless communication protocol. The input device 16 has a plurality of operating members such as operation buttons. Holding the input device 16 by hand, the user manipulates its operating members with fingertips. The input device 16 is used as a controller for the information processing apparatus 10 and for the HMD 100. For example, during execution of a video game by the information processing apparatus 10, the input device 16 is used as a game controller. The input device 16 has an inertial measurement unit (IMU) that includes a three-axis acceleration sensor and a three-axis angular velocity sensor, transmitting sensor data to the information processing apparatus 10 in a predetermined cycle (e.g., 800 Hz).

The HMD 100 incorporates a plurality of imaging sections 14. These imaging sections 14 are attached to different positions at different postures on a front surface of the HMD 100 in such a manner that an entire imaging range obtained by adding up individual imaging ranges of the imaging sections 14 covers an entire visual field of the user. The imaging sections 14 may each have a visible light sensor for use in common digital video cameras, such as a charge coupled device (CCD) sensor or a complementary metal oxide semiconductor (CMOS) sensor. Alternatively, the imaging sections 14 may each have a non-visible light sensor. The plurality of imaging sections 14 capture images of a real space in front of the user in a predetermined cycle (e.g., 120 frames/second) at synchronized timing, and transmit the captured image data of the real space to the information processing apparatus 10.

Figure 2:
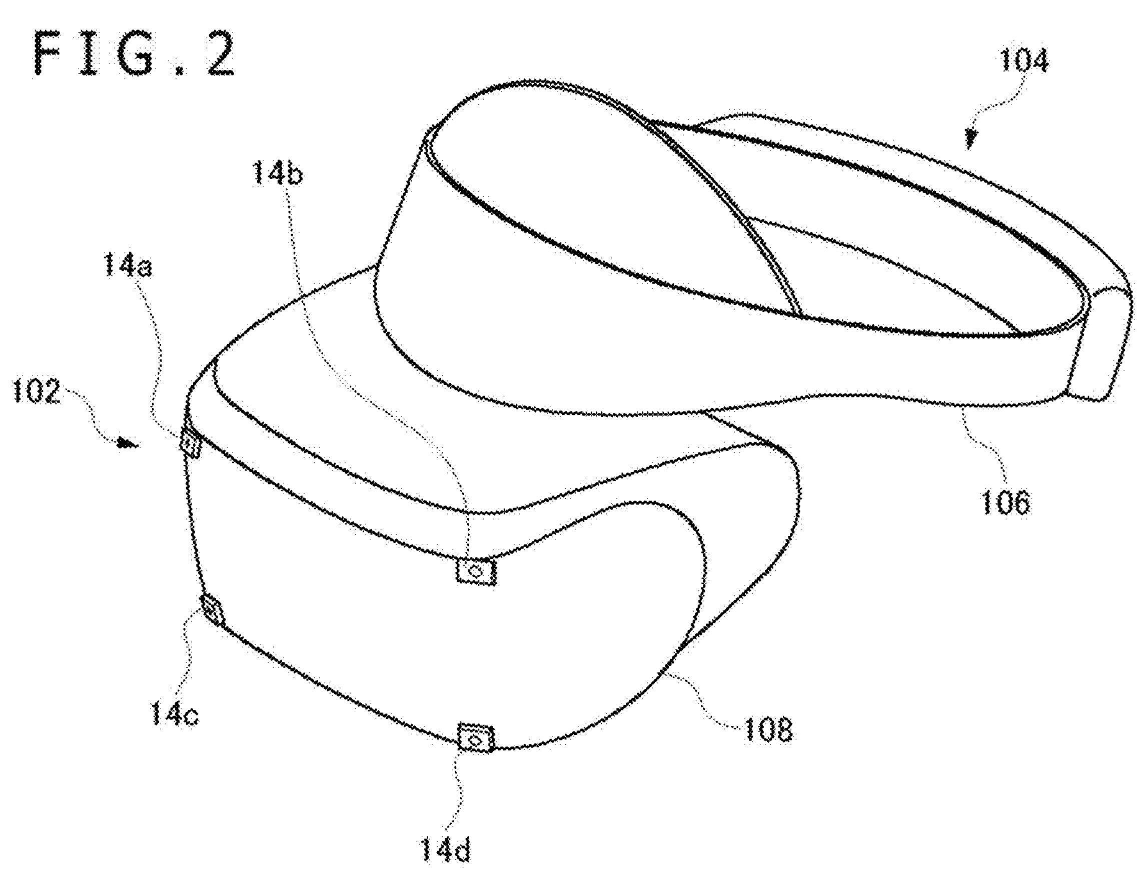
FIG. 2 is a schematic view depicting an exemplary external appearance of an HMD.

FIG. 2 depicts an exemplary external appearance of the HMD 100. The HMD 100 includes an output mechanism part 102 and a wearing mechanism part 104. The wearing mechanism part 104 includes a wearing band 106 which, when worn by the user, encircles the user's head to secure the HMD 100 thereon. The wearing band 106 has such a material or structure that permits adjustment in length to the circumference of the user's head.

The output mechanism part 102 includes a housing 108 shaped in such a manner as to cover the user's both eyes when the HMD 100 is worn by the user. Inside the housing 108 are the display panels directly facing the eyes of the user wearing the HMD 100. The display panels may each be a liquid crystal panel or an organic electroluminescence (EL) panel. Also inside the housing 108 are a pair of right and left optical lenses positioned between the display panels and the user's eyes so as to expand the user's viewing angle. The HMD 100 may further include speakers or earphones positioned in a manner corresponding to the user's ears. The HMD 100 may also be configured to permit connection with external headphones.

A front outer surface of the housing 108 is equipped with a plurality of imaging devices 14*a*, 14*b*, 14*c*, and 14*d* constituting the imaging sections 14. In reference to a front face direction of the user, the imaging device 14*a* is attached to a top right corner of the front outer surface in such a manner that its camera optical axis is oriented to the upper right; the imaging device 14*b* is attached to a top left corner of the front outer surface in such a manner that its camera optical axis is oriented to the upper left; the imaging device 14*c* is attached to a bottom right corner of the front outer surface in such a manner that its camera optical axis is oriented to the lower right; and the imaging device 14*d* is attached to a bottom left corner of the front outer surface in such a manner that its camera optical axis is oriented to the lower left.

With the plurality of imaging sections 14 installed as described above, the entire imaging range obtained by adding up their individual imaging ranges covers the entire visual field of the user. That is, the imaging sections 14 including the plurality of imaging devices 14*a*, 14*b*, 14*c*, and 14*d* capture images of a real space in front of the user wearing the HMD 100, i.e., images of the real space within the user's visual field. In the description that follows, data of the images captured by the imaging sections 14 of the HMD 100 may be referred to as "captured image data."

The HMD 100 transmits to the information processing apparatus 10 the sensor data detected by the IMU and the image data captured by the imaging sections 14. The HMD 100 receives the image data and audio data of applications (e.g., video games) generated by the information processing apparatus 10.

Figure 3:
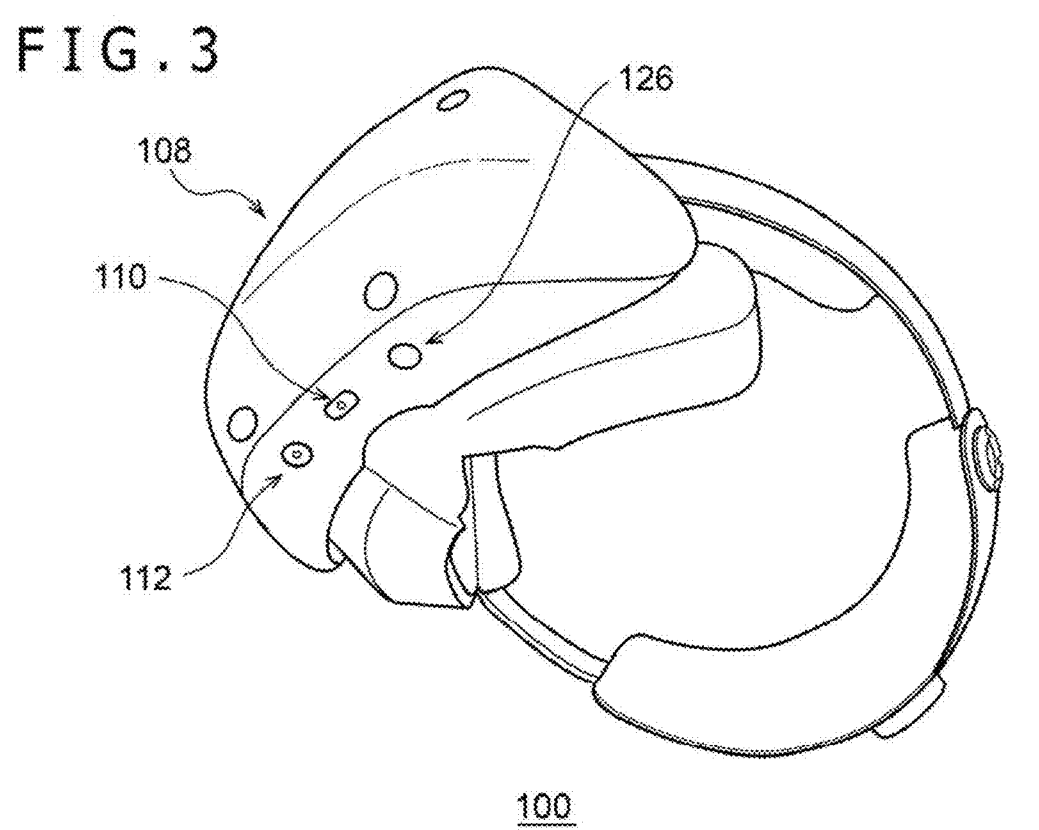
FIG. 3 is a schematic view depicting another exemplary external appearance of the HMD.

FIG. 3 depicts another exemplary external appearance of the HMD 100. This schematic view indicates the HMD 100 as seen from below. A lower outer surface of the housing 108 has a microphone 126, a power button 110, and a function button 112 arranged in that order from left to right and adjacent to each other as seen from the user wearing the HMD 100. The microphone 126 is audio equipment that converts sound emitted by the user to an electrical signal (also referred to as "audio data"). The power button 110 is a button that turns on and off the supply of power from a predetermined power source (e.g., battery, not depicted) to various sections of the HMD 100 (e.g., control section 120 and display panels 130, to be discussed later). The function button 112 is a button that can selectively be assigned one of a plurality of functions regarding the operation of the HMD 100.

Figure 4:
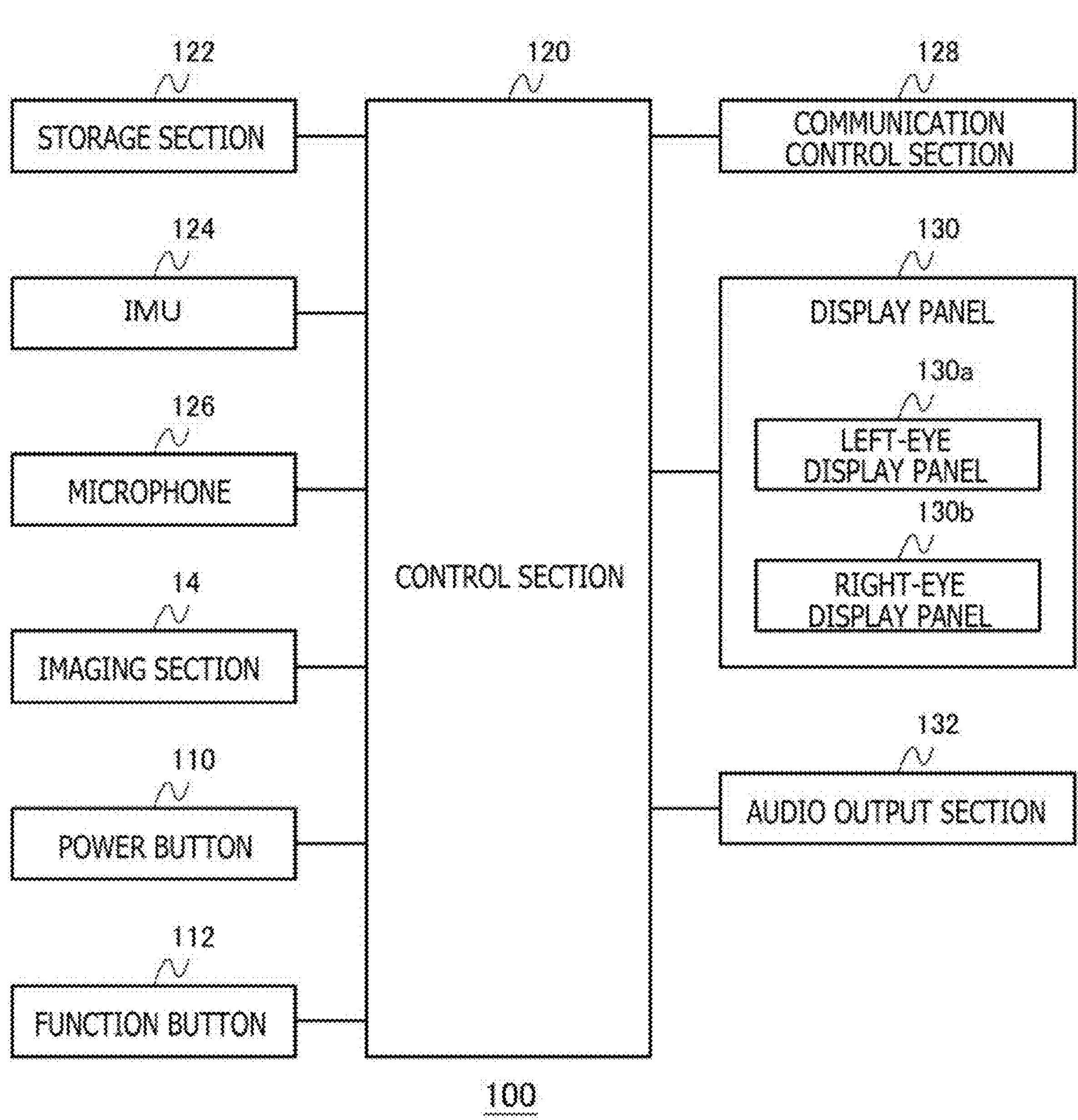
FIG. 4 is a schematic view depicting functional blocks of the HMD.

FIG. 4 depicts functional blocks of the HMD 100. The control section 120 is a main processor that processes various kinds of data such as image data, audio data, and sensor data and commands and outputs the processed data and commands. The control section 120 may include a central processing unit (CPU) or a graphics processing unit (GPU). A storage section 122 temporarily stores the data and commands to be processed by the control section 120. An IMU 124 acquires sensor data regarding motion of the HMD 100. The IMU 124 may at least include a three-axis acceleration sensor and a three-axis angular velocity sensor. The IMU 124 detects values of respective axis components (also referred to as "sensor data") in a predetermined cycle (e.g., 800 Hz).

A communication control section 128 transmits the data output from the control section 120, to the external information processing apparatus 10 in a wired or wireless manner via a network adapter or an antenna. Also, the communication control section 128 receives data from the information processing apparatus 10 and outputs the received data to the control section 120.

Upon receipt of image data and audio data of various applications (e.g., video games) from the information processing apparatus 10, the control section 120 supplies the image data to the display panels 130 for display and sends the audio data to an audio output section 132 (e.g., speakers) for audio output. The display panels 130 include a left-eye display panel 130*a* and a right-eye display panel 130*b*, the two panels displaying a pair of parallax images. The control section 120 further causes the communication control section 128 to transmit the sensor data from the IMU 124, the audio data from the microphone 126, and the captured image data from the imaging sections 14 to the information processing apparatus 10.

Figure 5:
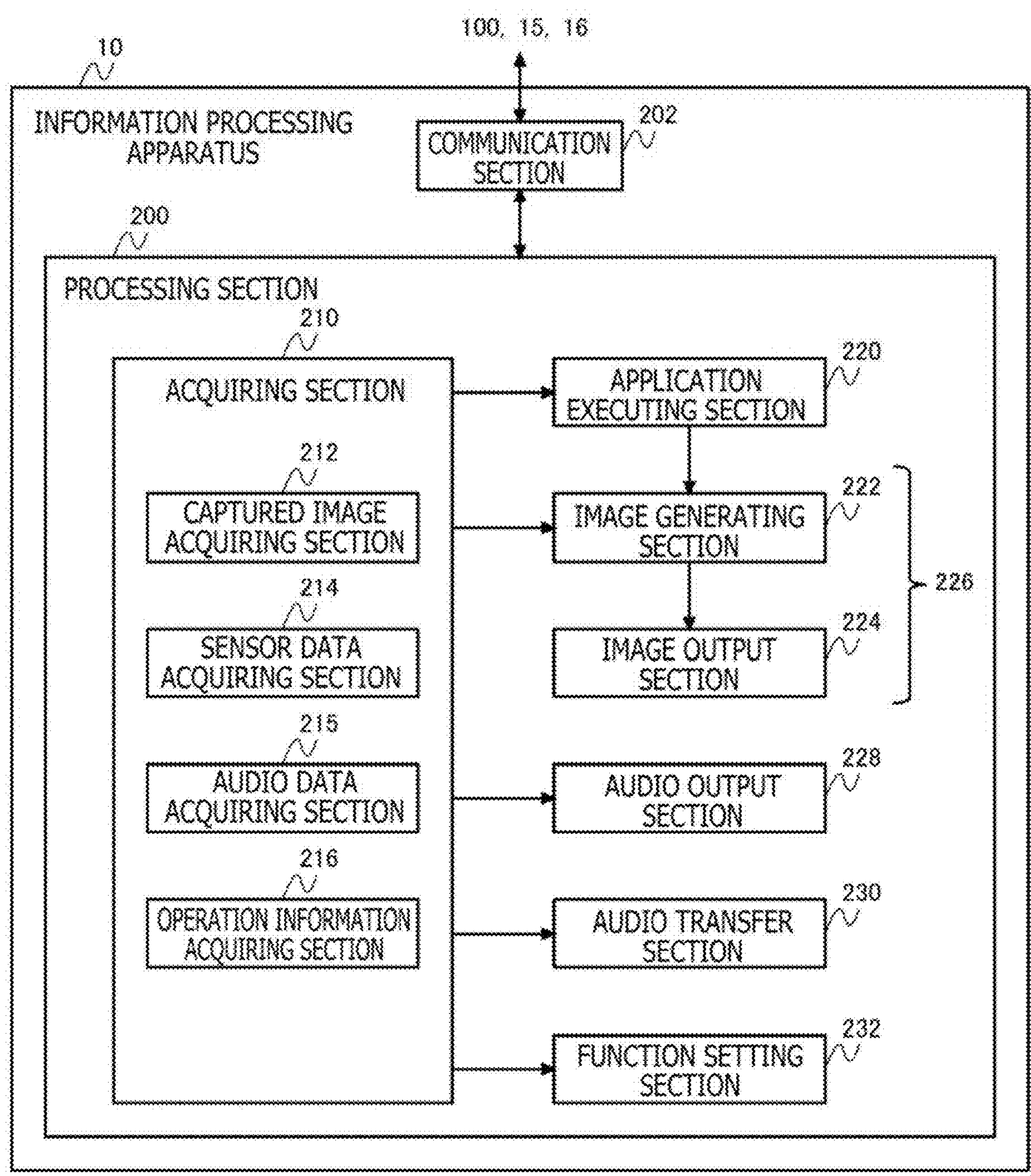
FIG. 5 is a schematic view depicting functional blocks of an information processing apparatus.

FIG. 5 indicates functional blocks of the information processing apparatus 10. The information processing apparatus 10 includes a processing section 200 and a communication section 202. The processing section 200 includes an acquiring section 210, an application executing section 220, an image generating section 222, an image output section 224, an audio output section 228, an audio transfer section 230, and a function setting section 232. The acquiring section 210 includes a captured image acquiring section 212, a sensor data acquiring section 214, an audio data acquiring section 215, and an operation information acquiring section 216.

The communication section 202 communicates with external apparatuses in accordance with a predetermined communication protocol. The external apparatuses include the HMD 100, the output apparatus 15, the input device 16, and a server or another information processing apparatus, both not depicted. For example, the communication section 202 receives the operation information and sensor data transmitted from the input device 16 and supplies what is received to the acquiring section 210. The communication section 202 also receives the captured image data and sensor data transmitted from the HMD 100 and supplies what is received to the acquiring section 210.

Figure 8:
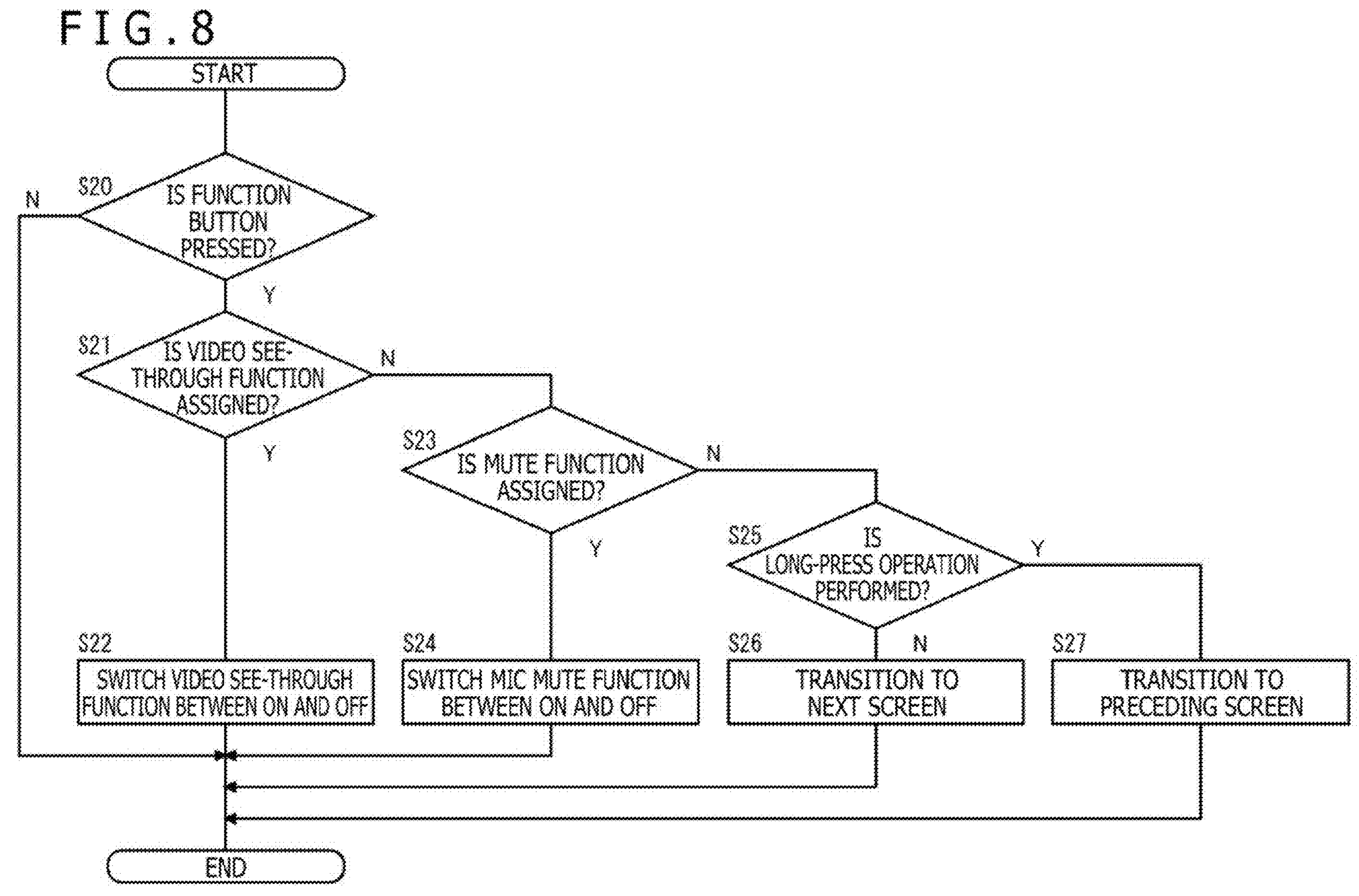
FIG. 8 is a flowchart indicating other operations of the content display system.

The information processing apparatus 10 includes a computer that implements various functions indicated in FIG. 5 by executing relevant programs. The computer includes, in terms of hardware, a memory into which programs are loaded, at least one processor (CPU, GPU, etc.) that executes the loaded programs, an auxiliary storage device, and other large-scale integration (LSI) circuits. The processor includes a plurality of electronic circuits including semiconductor integrated circuits and LSI circuits. The plurality of electronic circuits may be mounted on a single chip or on a plurality of chips. The functional blocks indicated in FIG. 8 are implemented by coordination between hardware and software. It will thus be understood by those skilled in the art that these functional blocks can be implemented by hardware alone, by software alone, or by a combination of the two in diverse forms.

The captured image acquiring section 212 acquires the captured image data transmitted from the HMD 100, and supplies what is acquired to the application executing section 220 and the image generating section 222. The sensor data acquiring section 214 acquires the sensor data transmitted from the input device 16 and the HMD 100, and supplies what is acquired to the application executing section 220 and the image generating section 222.

The audio data acquiring section 215 acquires a remote user's audio data (also referred to as "external audio data" hereunder) that is sent from an external apparatus (other than the HMD 100) and transferred via the network 2, and supplies the acquired data to the audio output section 228. Also, the audio data acquiring section 215 acquires the audio data of the user wearing the HMD 100 (also referred to as "user audio data" hereunder), the data being transmitted from the HMD 100, and supplies the acquired data to the audio transfer section 230.

The operation information acquiring section 216 acquires the operation information indicative of the user's operations input to the input device 16, the information being transmitted from the input device 16. Also, the operation information acquiring section 216 acquires the operation information indicative of the user's operations input to the HMD 100 (e.g., on its function button 112), the information being transmitted from the HMD 100. The operation information acquiring section 216 supplies the acquired operation information to various sections of the HMD 100.

The application executing section 220 executes applications on the basis of the operation information input from the operation information acquiring section 216 and the sensor data input from the sensor data acquiring section 214. By so doing, the application executing section 220 allows a VR game to progress, for example.

The image generating section 222 and the image output section 224 function as a display control section 226 that controls the display of electronic content on display sections (specifically, at least either the display panels 130 of the HMD 100 or the display of the output apparatus 15). Specifically, the image generating section 222 generates image data for display on the HMD 100 (e.g., VR image data) on the basis of the captured image data input from the captured image acquiring section 212 and the result of execution of applications by the application executing section 220, for example. The image output section 224 transmits the display image data generated by the image generating section 222 to the HMD 100. In turn, the HMD 100 is caused to display the transmitted image data on its display panels 130.

Further, the image generating section 222 generates image data for display on the output apparatus 15 on the basis of the result of execution of applications by the application executing section 220, for example. For example, the image data here may be image data of content arranged to explain how to set up the HMD 100. The image output section 224 transmits the display image data generated by the image generating section 222 to the output apparatus 15 for display thereon. The image output section 224 may also transmit the image data destined for the HMD 100 to the output apparatus 15 for display thereon.

The audio output section 228 transmits to the HMD 100 the remote user's audio data (external audio data) acquired by the audio data acquiring section 215 and the audio data of applications. The HMD 100 is then caused to reproduce sound based on the transmitted audio data.

The audio transfer section 230 transmits via the network 2 the audio data of the user wearing the HMD 100 (user audio data) to an external apparatus (e.g., remote user's apparatus), the user audio data being acquired by the audio data acquiring section 215. The external apparatus is then caused to reproduce sound based on the transmitted user audio data.

In a case where an operation designating assignment of a specific function to the function button 112 of the HMD 100 is acquired by the operation information acquiring section 216, the function setting section 232 carries out a setting process corresponding to the function assigned to the function button 112.

The workings of the content display system 1 configured as described above are explained below.

Figure 6:
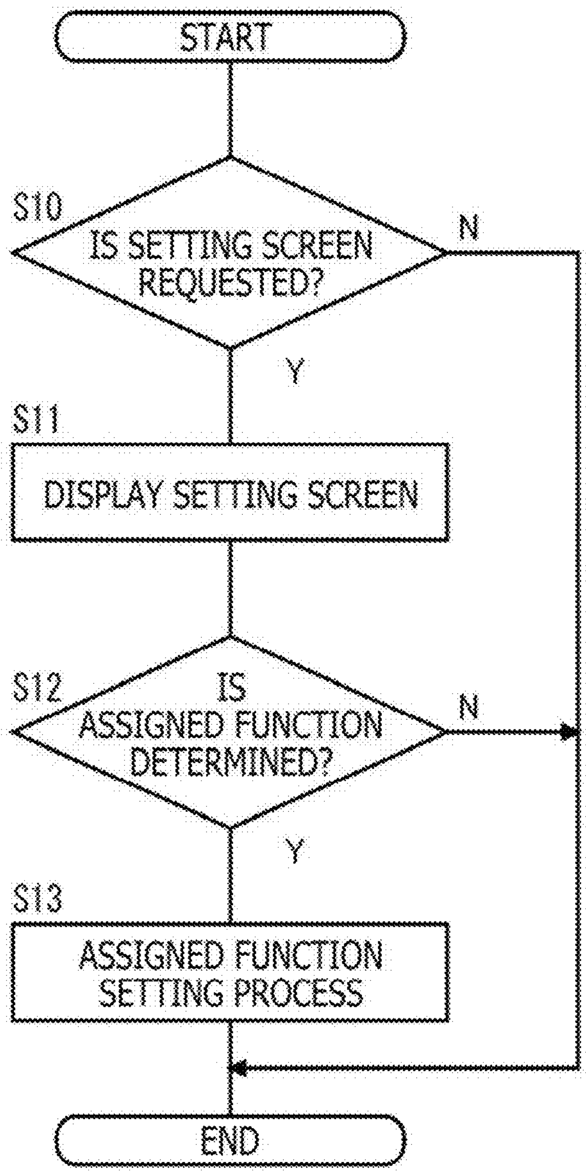
FIG. 6 is a flowchart indicating operations of the content display system.

FIG. 6 is a flowchart indicating operations of the content display system 1. The user wearing the HMD 100 uses the input device 16 to input operations requesting display of a setting screen for the function to be assigned to the function button 112. The input device 16 transmits the operation information indicative of the request for the setting screen to the information processing apparatus 10. Upon acquisition of the operation information by the operation information acquiring section 216 of the information processing apparatus 10 (Y in S10), the image generating section 222 of the information processing apparatus 10 generates data of the setting screen for the function button 112. The image output section 224 of the information processing apparatus 10 transmits the data of the setting screen for the function button 112 to the HMD 100. The control section 120 of the HMD 100 causes the display panels 130 to display the setting screen for the function button 112 (S11).

Figure 7:
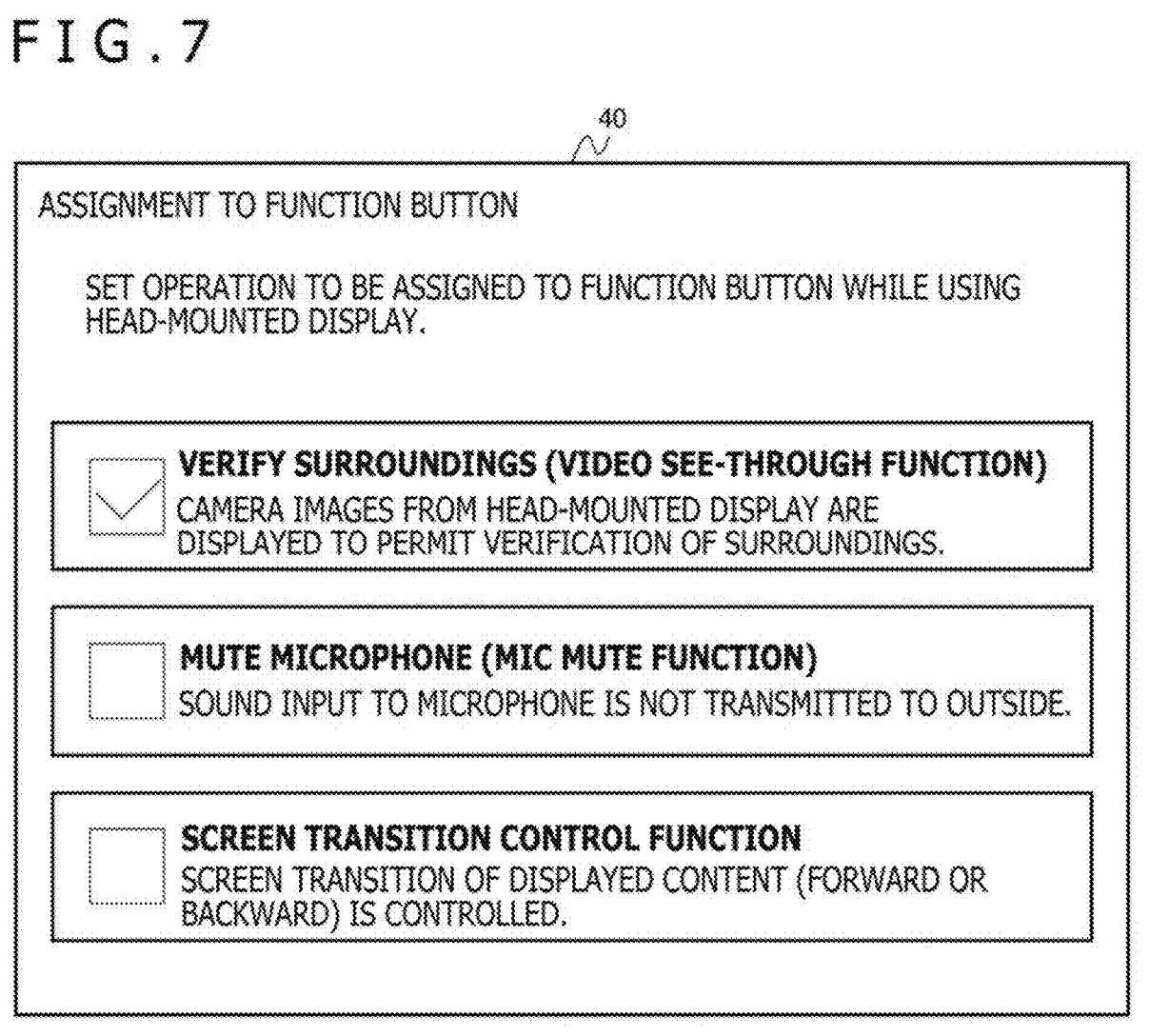

FIG. 7 depicts an exemplary setting screen for the function button 112. A setting screen 40 is designed to allow the user to freely select one of a plurality of predetermined functions assignable to the function button 112. In this embodiment, the functions assignable to the function button 112 include the following functions (1) through (3).

(1) Video see-through function. Specifically, this is a function that causes the display panels 130 to display images captured by the imaging sections 14 in the front direction of the user.

While wearing the HMD 100, the user finds it difficult to check the outside whenever desired. Once taking the HMD 100 off the head to check the outside, the user has trouble wearing it back in the most comfortable position on the head. In a case where the video see-through function is assigned to the function button 112, pressing the function button 112 allows the user to check the outside state while wearing the HMD 100. In this embodiment, the video see-through function from among the plurality of functions assignable to the function button 112 is assigned thereto by default.

(2) Mic mute function. Specifically, this is a function that cuts off transmission of the user's voice input to the microphone 126 to the outside.

Pressing the function button 112 of the HMD 100 to which this function is assigned makes it easily switchable between mute and unmute of the microphone 126. This improves the use-friendliness of the HMD 100 for the user carrying out voice chat with another user.

(3) Screen transition control function. Specifically, this is a function that controls screen transition of content displayed on the display section. The display section here may be the display of the output apparatus 15 or the display panels 130 of the HMD 100. Of content options for display on the display section, there may be some that the user may want to make a progress without holding the input device 16 by hand, such as learning how to wear the HMD 100. During display of such content, pressing the function button 112 of the HMD 100 permits easy control of content screen transition (e.g., forward or backward). This improves the user-friendliness of the HMD 100. For example, in a case where the user wants to control content screen transition without holding the input device 16, there is no need for the user to grip the input device 16 for the moment. This alleviates the burden on the user.

With reference back to FIG. 6, the user selects the desired function to be assigned to the function button 112 on the setting screen 40 and inputs a predetermined decision operation to the input device 16. For example, in a case where the user wears the HMD 100 to view VR content or to play a VR game, the user selects either the (1) video see-through function or the (2) mic mute function. In a case where the user uses the output apparatus 15 to view the content of which the story progresses with a plurality of screens transitioning from one to another (e.g., content for learning how to wear the HMD 100), the user selects the (3) screen transition control function.

When the decision operation is acquired by the operation information acquiring section 216 of the information processing apparatus 10 (Y in S12), the function setting section 232 of the information processing apparatus 10 identifies the function selected on the setting screen 40 at this time as the function to be assigned to the function button 112. The function setting section 232 then performs a setting process corresponding to the function to be assigned to the function button 112 (S13).

For example, suppose that the user selects on the setting screen 40 the video see-through function to be assigned to the function button 112. In this case, the function setting section 232 sets the image generating section 222 to generate the display image for the HMD 100 on the basis of the image data that is captured by the imaging sections 14 of the HMD 100 and is acquired by the captured image acquiring section 212. Here, the display image for the HMD 100 is an image indicative of the real space in the front direction of the user.

As another example, suppose that the user selects on the setting screen 40 the mic mute function as the function to be assigned to the function button 112. In this case, the function setting section 232 sets the audio transfer section 230 not to transmit to the external apparatus the audio data of the user wearing the HMD 100, the audio data being acquired by the audio data acquiring section 215. As an alternative example, the function setting section 232 may implement mute by setting the audio data acquiring section 215 not to acquire or output the user's audio data transmitted from the HMD 100. As a further alternative, the function setting section 232 may implement mute by setting the microphone 126 of the HMD 100 not to output the electrical signal (audio data) based on sound input from the outside.

As yet another alternative example, suppose that the user selects on the setting screen 40 the screen transition control function as the function to be assigned to the function button 112. In this case, the function setting section 232 sets the application executing section 220 and/or the image generating section 222 to recognize an operation of pressing the function button 112 for a relatively short time (also referred to as a "short-press operation") as the operation to make the content screen transition in a first direction.

Also, the function setting section 232 sets the application executing section 220 and/or the image generating section 222 to recognize an operation of pressing the function button 112 for a relatively long time (also referred to as a "long-press operation") as the operation to make the content screen transition in a second direction opposite to the first direction. The short-press operation may be an operation of pressing the function button 112 for less than a first time period (e.g., 0.5 seconds). The long-press operation may be an operation of pressing the function button 112 for at least a second time period longer than the first time period (e.g., 2 seconds).

In this embodiment, the first direction can be said to be the direction in which content progresses with its plurality of screens switched one after another over time. In other words, the first direction can be said to be the direction of the next screen in chronological order of screens. The second direction can be said to be the direction in which the content goes backward in time. In other words, the second direction can be said to be the direction of the preceding screen in chronological order of screens. That is, in this embodiment, the short-press operation on the function button 112 is the operation of designating transition to the next screen, and the long-press operation on the function button 112 is the operation of designating transition back to the preceding screen.

If the operation to determine the function to be assigned to the function button 112 has yet to be input to the setting screen 40 (N in S12), the function assigning process of S13 is skipped. If display of the setting screen 40 is not requested (N in S10), step S11 and subsequent steps are skipped, and the processing indicated in FIG. 6 is brought to an end.

FIG. 8 is a flowchart indicating other operations of the content display system 1. In a case where the user wants to use the function assigned to the function button 112 while viewing the content displayed on the display panels 130 of the HMD 100 or on the output apparatus 15, the user presses the function button 112. In the case where the function button 112 is pressed (Y in S20), the control section 120 of the HMD 100 transmits the operation information indicating that the function button 112 has been pressed to the information processing apparatus 10 via the communication control section 128. The operation information acquiring section 216 of the information processing apparatus 10 acquires the operation information indicating that the function button 112 has been pressed, and notifies the various sections of the information processing apparatus 10 of the press operation on the function button 112.

In the case where the video see-through function is assigned to the function button 112 (Y in S21), the processing section 200 of the information processing apparatus 10 switches the video see-through function between on and off in response to the function button 112 being pressed at this point (S22). For example, if the press operation on the function button 112 is input with the video see-through function in the off state, the video see-through function is turned on. While the video see-through function is in the on state, the image generating section 222 generates the display image that is based on the captured image data from the imaging sections 14 of the HMD 100 and is indicative of the real space in the front direction of the user, in place of the content image (e.g., VR game image) based on the result of execution of the application by the application executing section 220. The image output section 224 of the information processing apparatus 10 causes the display panels 130 of the HMD 100 to display the display image indicating the real space in the front direction of the user.

On the other hand, if the press operation on the function button 112 is input with the video see-through function in the on state, the video see-through function is turned off. Once the video see-through function is turned off, the image generating section 222 again starts generating the content image (e.g., VR game image) based on the result of execution of the application by the application executing section 220. The image output section 224 of the information processing apparatus 10 causes the display panels 130 of the HMD 100 to resume display of the content image based on the result of execution of the application. Alternatively, not only in the case where the function button 112 of the HMD 100 is pressed but also where a predetermined operation (e.g., pressing of a particular button) is input to the input device 16, the information processing apparatus 10 may switch the video see-through function from on to off.

In the case where the mic mute function is assigned to the function button 112 (N in S21) (Y in S23), the processing section 200 of the information processing apparatus 10 switches the mic mute function between on and off in response to the function button 112 being pressed at this point (S24). For example, if the press operation on the function button 112 is input with the mic mute function in the off state, the mic mute function is turned on. While the mic mute function is in the on state, the audio transfer section 230 suppresses transmission of the user audio data acquired by the audio data acquiring section 215 to a remote external apparatus via the network 2.

On the other hand, if the press operation on the function button 112 is input with the mic mute function in the on state, the mic mute function is turned off. Once the mic mute function is turned off, the audio transfer section 230 resumes transmission of the user audio data acquired by the audio data acquiring section 215 to the remote external apparatus via the network 2.

In the case where the screen transition control function is assigned to the function button 112 (N in S23) and where the short-press operation is performed on the function button 112 (N in S25), the image generating section 222 generates an image indicative of the screen next to the currently displayed content screen. The image output section 224 causes the output apparatus 15 to display the image indicative of the next screen (S26). In the case where the long-press operation is performed on the function button 112 (Y in S25), the image generating section 222 generates an image indicative of the screen immediately preceding the currently displayed content screen. The image output section 224 causes the output apparatus 15 to display the image indicative of the immediately preceding screen (S27). If no press operation is performed yet on the function button 112 (N in S20), step S21 and subsequent steps are skipped, and the processing in FIG. 8 is terminated.

Figure 9:
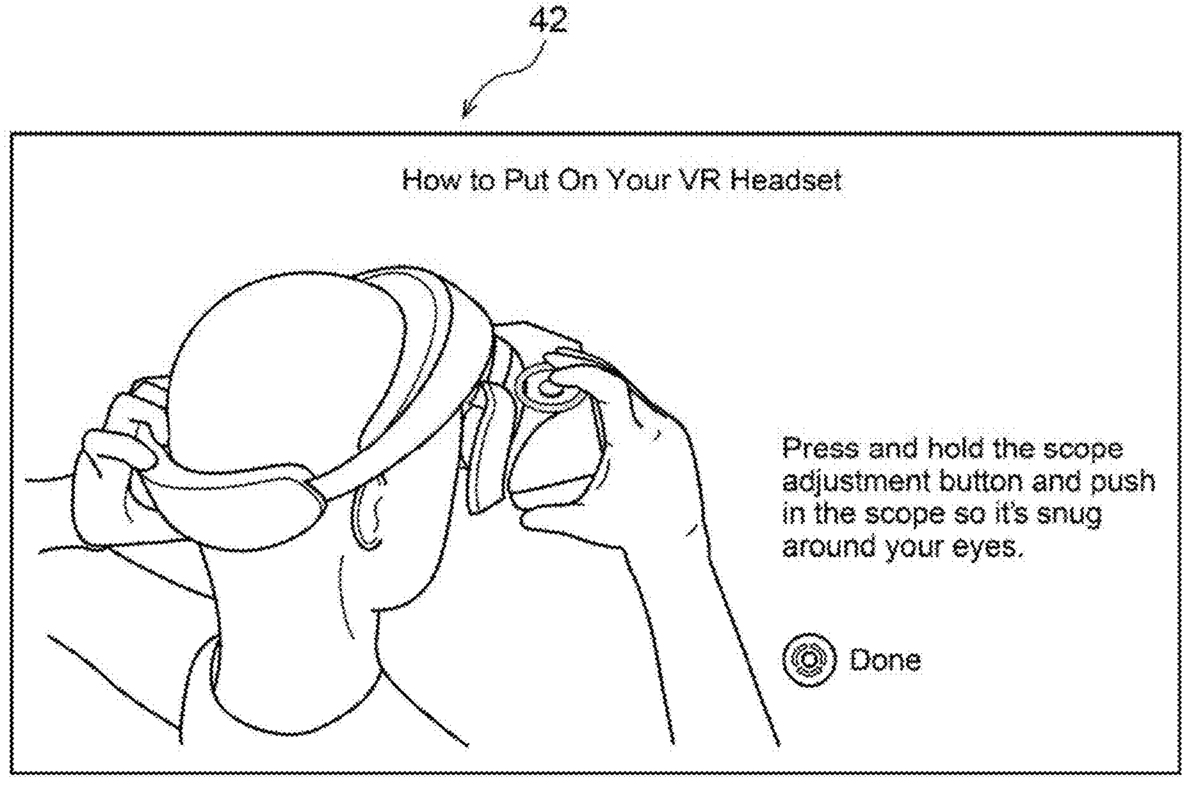
FIG. 9 is a schematic view depicting an exemplary setup screen.

FIG. 9 depicts an exemplary setup screen 42. The setup screen 42 is one of the screens within the content for learning how to set up the HMD 100 (e.g., how to wear it on the head), the screens being displayed on the output apparatus 15. While viewing the content displayed on the output apparatus 15, the user tries wearing the HMD 100 with the output mechanism part 102 and the wearing mechanism part 104 of the HMD 100 held by hand. It is assumed here that the screen transition control function is assigned to the function button 112.

Figure 10:
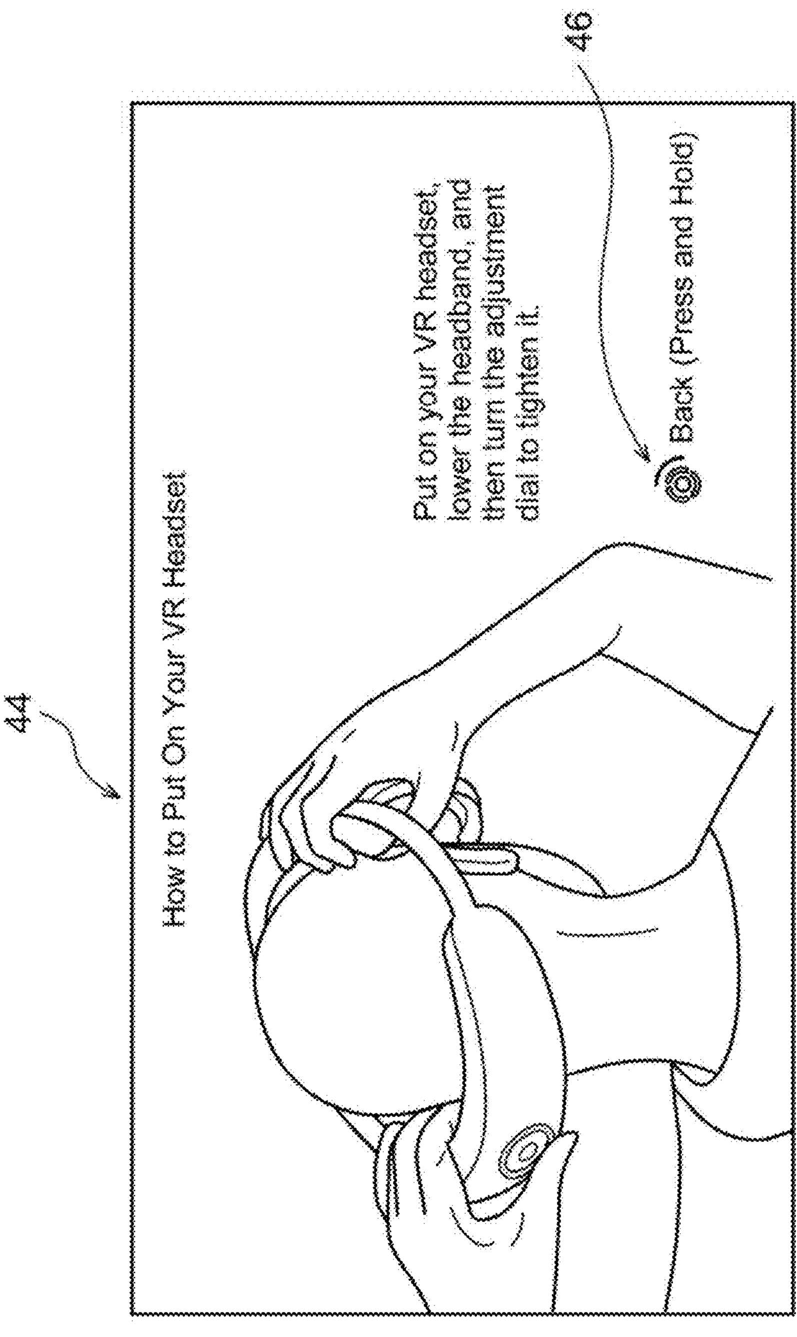
FIG. 10 is a schematic view depicting another exemplary setup screen.

If the user inputs the short-press operation on the function button 112 during display of the setup screen 42, transition is made to a setup screen 44. FIG. 10 depicts an exemplary setup screen 44. The setup screen 44 is one of the screens within the content and is the screen next to the setup screen 42 along the time axis.

When the user keeps pressing the function button 112 during display of the setup screen 44, the image generating section 222 generates the setup screen 44 that includes a press time indicator 46. In other words, the press time indicator 46 is arranged on the setup screen 44. The press time indicator 46 is an image suggesting both a continuously pressed state of the function button 112 and the length of the press time of the function button 112. The image output section 224 transmits the setup screen 44 with the press time indicator 46 arranged thereon to the output apparatus 15, thereby updating the setup screen 44 displayed on the output apparatus 15. The press time indicator 46 is updated in such a manner that its circular indication is complete when the press time of the function button 112 meets the condition for enabling the long-press operation.

When the press time of the function button 112 on the setup screen 44 reaches and exceeds a predetermined time period (e.g., 2 seconds) as the condition for enabling the long-press operation, the image generating section 222 again generates the setup screen 42. The image output section 224 causes the HMD 100 to again display the setup screen 42. In a case where the press time of the function button 112 on the setup screen 44 reaches and exceeds the first time period (e.g., 0.5 seconds) as the condition for enabling the short-press operation but falls short of the second time period (e.g., 2 seconds) as the condition for enabling the long-press operation, i.e., where the function button 112 is released before the second time period as the condition for enabling the long-press operation is complete, screen transition to the setup screen 42 is cancelled, and the display of the setup screen 44 is maintained.

With the content display system 1 of this embodiment, the function button of the HMD 100 can be assigned one of a plurality of functions that conforms to the type of the content viewed by the user and to the viewing status of the content. This improves the user-friendliness of the HMD 100.

The present invention has been described above in conjunction with a specific embodiment. It is to be understood by those skilled in the art that this embodiment is merely an example, that combinations of the constituent elements and of processes of the embodiment can be modified in various manners, and that such variations also fall within the scope of the present invention.

Although not discussed in conjunction with the above embodiment, an application executed by the information processing apparatus 10 may dynamically set the function of the function button 112. In other words, the function of the function button 112 may be set dynamically according to the content displayed on the HMD 100 or on the output apparatus 15. For example, the program of the content for learning how to wear the HMD 100 as depicted in FIGS. 9 and 10 (referred to as "target content" hereunder) may be arranged to assign the screen transition control function to the function button 112. The function setting section 232 of the information processing apparatus 10 may then carry out a setting process corresponding to the screen transition control function assigned to the function button 112, in accordance with the program of the target content. This allows the screen transition control function to be assigned automatically to the function button 112 upon reproduction of the target content. Without manually assigning the screen transition control function to the function button 112, the user can control screen transition of the target content by operating the function button 112 while viewing the target content.

The functions of the information processing apparatus 10 described in conjunction with the embodiment above may alternatively be incorporated in the HMD 100. In other words, the HMD 100 may include the functions of the information processing apparatus 10 of the embodiment. Whereas the imaging sections 14 are attached to the HMD 100 in the embodiment, the imaging sections 14 may alternatively be positioned other than on the HMD 100.

Also, suitable combinations of the above-described embodiment and its variations are each effective as another embodiment of the present disclosure. The new embodiments thus implemented provide the effects of both the initial embodiment and the variations combined therewith. It will further be understood by those skilled in the art that the functions to be exerted by the constituent elements stated in the claims are implemented either by each of the constituent elements discussed above in connection with the embodiment and its variations or by a coordinated combination of these individual constituent elements.

The technical idea stated in conjunction with the above embodiment and its variations can be implemented in the following configurations.

Item 1

A head-mounted display including:

a power button; and a function button different from the power button, the function button being able to be selectively assigned one of a plurality of functions regarding an operation of the head-mounted display.

This head-mounted display allows its function button to be assigned one of a plurality of functions according to the type of content viewed by a user and the viewing status of the content. This improves the user-friendliness of the head-mounted display.

Item 2

The head-mounted display stated in item 1 above, further including:

an imaging section configured to capture an image of a front direction of a user wearing the head-mounted display; and a display section configured to display an image in front of eyes of the user;

in which the plurality of functions include a function of causing the display section to display the image of the front direction of the user captured by the imaging section.

This configuration allows the user to check what it is like outside by operating the function button at a desired timing, thereby improving the user-friendliness of the head-mounted display.

Item 3

The head-mounted display stated in item 1 or 2 above, further including:

a microphone, in which the plurality of functions include a mute function that mutes sound input to the microphone.

This configuration allows the user to suppress transmission of sound to the outside by operating the function button at a desired timing, thereby improving the user-friendliness of the head-mounted display.

Item 4

The head-mounted display stated in any one of items 1 to 3 above, in which the plurality of functions include a function of controlling screen transition of content displayed on the display section.

This configuration can provide the user with diverse means of operating the content being viewed, thereby suppressing a decrease in the operability of the head-mounted display in a case where the user is unable to hold an input device, for example.

Item 5

The head-mounted display stated in any one of items 1 to 4 above, in which the power button and the function button are positioned adjacent to each other.

This configuration makes it easier to complete operations in a particular region on a housing of the head-mounted display, thereby improving its operability.

Item 6

A content display system including:

a head-mounted display; and a display control section, in which the head-mounted display includes a power button, and a function button different from the power button, the function button being able to be selectively assigned one of a plurality of functions regarding an operation of the head-mounted display, in which the plurality of functions include a function of controlling screen transition of content displayed on a display section, in which, in a case where the function of controlling the screen transition of the content is assigned to the function button, an operation of pressing the function button for a relatively short time constitutes an operation of causing a screen of the content to transition in a first direction, and an operation of pressing the function button for a relatively long time constitutes an operation of causing the screen of the content to transition in a second direction opposite to the first direction, and in which, in a case where a state of the function button being pressed is continued, the display control section causes the display section to display an image suggesting that the state of the function button being pressed is continued.

This content display system makes it easier to prevent an operation input error in the case where the short-press operation and the long-press operation performed on the function button result in different types of screen transition. This helps preventing the execution of screen transition not intended by the user.

INDUSTRIAL APPLICABILITY

The technology of the present disclosure can be applied to head-mounted displays, information processing systems, and the like.

REFERENCE SIGNS LIST

1: Content display system
10: Information processing apparatus
15: Output apparatus
100: HMD
110: Power button
112: Function button
126: Microphone
130: Display panel
226: Display control section
232: Function setting section

The invention claimed is:

1. A content display system comprising:

a head-mounted display, wherein the head-mounted display includes a power button; and a function button different from the power button, the function button being able to be selectively assigned one of a plurality of functions regarding an operation of the head-mounted display; and processing circuitry configured to:

display, at the head-mounted display, a screen for prompting a user to select the function to be assigned to the function button, and set the function according to the function assigned to the function button on the screen, wherein the plurality of functions include a function of controlling screen transition of content displayed on the head-mounted display, wherein, in a case where content that progresses without the user holding an input device is displayed on the head-mounted display, the function setting section automatically performs a process of assigning to the function button a function of controlling screen transition of the content.

2. The content display system according to claim 1, wherein the processing circuitry is further configured to:

capture an image of a front direction of a user wearing the head-mounted display, and display an image in front of eyes of the user, wherein the plurality of functions include a function to display the image of the front direction of the user.

3. The content display system according to claim 1, wherein the head-mounted display further includes a microphone, and wherein the plurality of functions include a mute function that mutes sound input to the microphone.

4. The content display system according to claim 1, wherein the head-mounted display has the power button and the function button positioned adjacent to each other.

5. The content display system according to claim 1, wherein the processing circuitry is further configured to;

capture an image of a front direction of a user wearing the head-mounted display, display an image in front of eyes of the user, and wherein the head-mounted display further includes a microphone, wherein the functions selectable on the screen include;

a function of causing the display to display the image of the front direction of the user, a mute function that mutes sound input to the microphone, and a function of controlling screen transition of content displayed on the display.

6. The content display system according to claim 1, wherein the processing circuitry is further configured to:

dynamically set the function of the function button according to a type of content being displayed on the head-mounted display.

7. The content display system according to claim 1, wherein the screen for prompting the user displays a plurality of selectable options corresponding to the plurality of functions, wherein one of the plurality of selectable options is set as a default option, and wherein the default option corresponds to a function that causes the head-mounted display to display an image of a front direction of a user captured by the head-mounted display.

8. The content display system according to claim 1, wherein the processing circuitry is further configured to:

maintain the function assigned to the function button until a new function is selected on the screen for prompting the user to select the function.

9. A content display system, comprising:

processing circuitry; and a head-mounted display, wherein the head-mounted display includes a power button; and a function button different from the power button, the function button being able to be selectively assigned one of a plurality of functions regarding an operation of the head-mounted display, wherein the plurality of functions include a function of controlling screen transition of content displayed on a display, wherein, in a case where the function of controlling the screen transition of the content is assigned to the function button, an operation of pressing the function button for less than a first time period constitutes an operation of causing a screen of the content to transition in a first direction, and an operation of pressing the function button for at least a second time period longer than the first time period constitutes an operation of causing the screen of the content to transition in a second direction opposite to the first direction, and wherein, in a case where a state of the function button being pressed is continued, the processing circuitry is configured to display an image indicating that the state of the function button being pressed is continued.

10. The content display system according to claim 9, wherein the first time period is 0.5 seconds, and the second time period is 2 seconds.

11. The content display system according to claim 9, wherein the image indicating that the state of the function button being pressed is continued includes a circular indicator that completes when a time associated with the function button being pressed reaches the second time period.

12. The content display system according to claim 9, wherein in a case where the function button is released after the first time period and before the second time period, the screen transition in the second direction is cancelled.

* * * * *